United States Patent [19]

Otaki et al.

[11] Patent Number: 5,802,406

[45] Date of Patent: Sep. 1, 1998

[54] FOCUSING GLASS AND PHOTOGRAPHIC SYSTEM

[75] Inventors: Tatsuro Otaki, Tokyo; Hitoshi Sakano, Yokohama, both of Japan

[73] Assignee: Nikon Corporation, Tokyo, Japan

[21] Appl. No.: 801,477

[22] Filed: Feb. 18, 1997

[30] Foreign Application Priority Data

Feb. 15, 1996 [JP] Japan ................... 8-027180

[51] Int. Cl.$^6$ ................................................. G03B 13/24
[52] U.S. Cl. ............................................................ 396/150
[58] Field of Search .................................. 396/148–152, 396/373, 378–381, 384–386; 430/5; 359/443, 456, 457, 580, 581, 738, 582; 355/71

[56] References Cited

U.S. PATENT DOCUMENTS 3,827,811  8/1974  Kato et al. .
4,208,115  6/1980  Proske ............................ 396/152
5,552,845  9/1996  Nagao et al. ..................... 396/380

OTHER PUBLICATIONS

U.S. application No. 08/667,601, Otaki et al., filed Jun. 21, 1996.

*Primary Examiner*—Howard B. Blankenship
*Attorney, Agent, or Firm*—Klarquist Sparkman Campbell Leigh & Whinston, LLP

[57] ABSTRACT

A focusing glass and photographic system employing the same are disclosed. The photographic system includes an objective lens operable to form a real image of an object. The focusing glass is adapted to be situated at the real-image position, and comprises a semitransparent region surrounding a fully transmissive photographic zone. The photographic zone defines a region of the field of view of the objective (the field of view being viewable on the focusing screen) defining the metes and bounds of a photographic image obtainable using the photographic system.

10 Claims, 2 Drawing Sheets

FOCUSING GLASS AND PHOTOGRAPHIC SYSTEM

FIELD OF THE INVENTION

The present invention pertains to a focusing glass or focusing screen as used to produce a viewable image in a finder of a camera, photomicrographic system, or other optical system.

BACKGROUND OF THE INVENTION

In many photographic apparatus and some microscopes including an optical system, a focusing glass (also termed a "focusing screen") is usually situated at a focusing point or a position conjugate to a focusing point of the optical system. The focusing glass can have any of various functions such as an aid for focusing the optical system, and/or an aid for determining the portion of the viewed image that will be photographically recorded or photometrically measured.

A typical prior-art focusing glass 20 is shown in FIG. 4. The focusing glass 20 includes lines defining a rectangular frame F indicating the portion of the circular field of view recordable on, e.g., 35-mm film. The focusing glass 20 also includes a circular frame D indicating the portion of the circular field of view that is subjected to photometry (i.e., subjected to a light-intensity reading for proper photographic exposure). The focusing glass 20 also comprises a reticle E (cross hairs) useful for indicating the center of the field of view and for making diopter corrections.

The portion of the focusing glass outside the frame F and lines within the frame F are conventionally formed by vapor deposition of a metal film such as chromium on an optical flat or other suitable optical surface. Such a metal film is completely opaque to visible light; as a result, the portion of the focusing glass within the frame F is bright, and the portion outside of the frame F appears completely dark. The lines within the frame F, including the circle D and reticle E appear as black lines against the portion of the image viewed within the frame F.

Thus, using a conventional focusing glass as shown in FIG. 4, only the area of the field of view within the frame F is visible to the viewer. This creates difficulty for the viewer, when viewing the portion of the field of view lying within the frame F, in ascertaining what may be outside the frame F. This problem is especially troublesome whenever the viewer can only briefly glance at the focusing glass before, e.g., making a photographic exposure. This is also a problem whenever the object has just entered the field F or whenever the object is a geometric pattern aligned with the frame F.

SUMMARY OF THE INVENTION

In view of the foregoing shortcomings of the prior art, an object of the present invention is to provide a focusing glass enabling the viewer to simultaneously observe the entire field of view of the optical system, as exhibited on the focusing glass, while clearly distinguishing the portion of the image falling within the frame from the portion of the image within the field of view but outside the frame.

To such end, and according to one aspect of the present invention, a photographic system is provided comprising an objective operable to form a real image of an object located in a field of view of the objective. The photographic system also comprises a "finder optical system" operable to guide light from the objective to a user's eye. The finder optical system comprises a focusing glass situated at a location where the real image is formed. The focusing glass comprises a semitransparent region surrounding a "photographic zone" having greater transmissivity to light than the semitransparent region. The semitransparent region and the photographic zone preferably collectively provide a user with a view of the entire field of view of the objective, wherein the photographic zone is smaller than the field of view.

With respect to the focusing glass, the semitransparent region preferably defines a frame delineating the photographic zone. In addition, the semitransparent region preferably has a transmissivity to the light of 10 to 60 percent, compared to the substantially 100-percent transmissivity of the photographic zone. The photographic zone can include a photometric zone delineated within the photographic zone. The photometric zone can include a reticle such as a crosshair pattern.

According to another aspect of the present invention, a focusing glass as summarized above is provided. Such a focusing glass is adapted to be placed at a location on an optical axis of an optical system at which a real image is formed of an object by an objective of the optical system.

The foregoing and additional features and advantages of the present invention will be more readily apparent from the following detailed description which proceeds with reference to the accompanying drawings.

DETAILED DESCRIPTION

The embodiment described below represents the current best mode of the invention.

Figure 1:
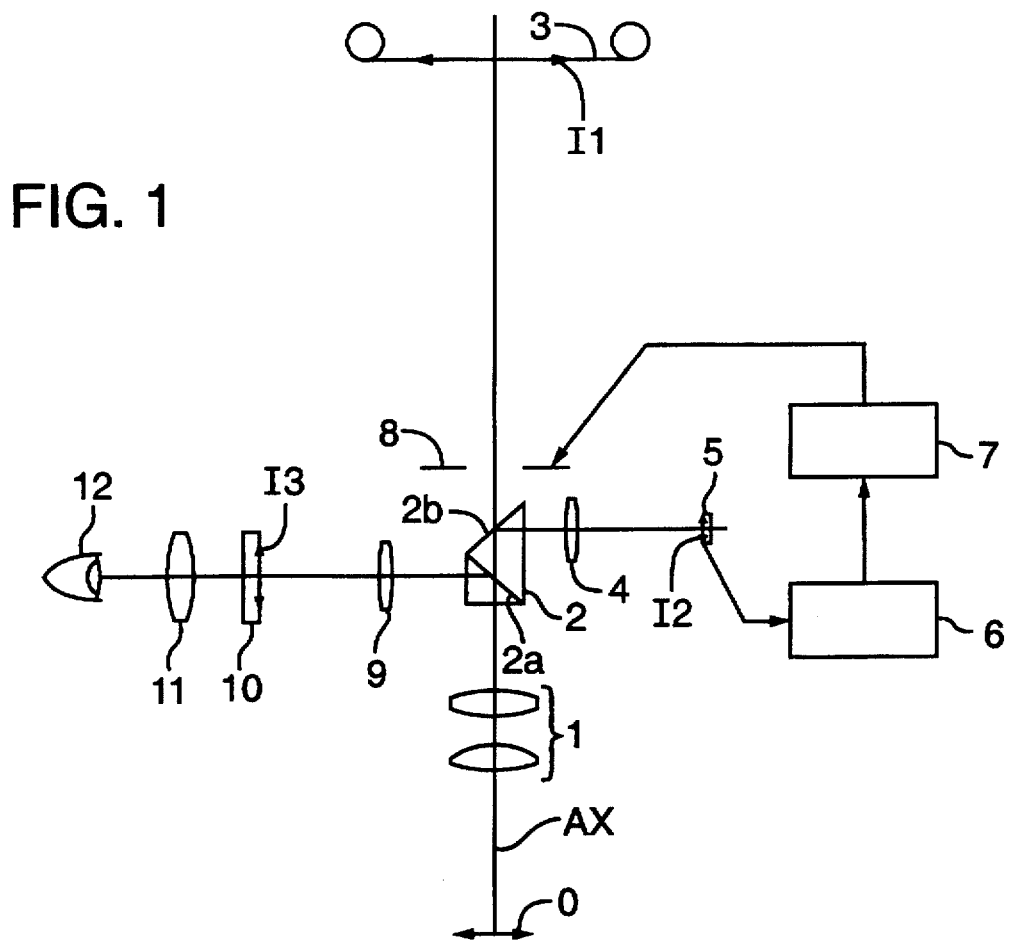
FIG. 1 is an optical diagram of an example embodiment of a photographic system, particularly adapted for a microscope, comprising a focusing glass according to the present invention.

Reference is made to FIG. 1 depicting a representative photographic system in which a focusing glass according to the invention can be advantageously employed. The optical elements shown in FIG. 1 are situated on an optical axis AX. (FIG. 1 is also shown in U.S. patent application Ser. No. 08/667,601, filed on Jun. 21, 1996, incorporated herein by reference.)

In FIG. 1, an object O is typically illuminated by an illumination system (not shown). The illumination light from the object is converged by an objective lens system 1 operable to form a real image I1 of the object on the surface of a film 3 or analogous recording medium. A prism 2 is situated downstream of the lens system 1, the prism 2 preferably being temporarily removable as required from its normal position as shown between the lens system 1 and the film surface 3. For example, during a photographic exposure, the prism 2 is displaced from the light path between the lens system 1 and the film surface 3.

The prism 2 comprises two reflective surfaces 2a, 2b. Preferably, the surface 2a is semitransparent and the surface 2b is fully reflective. Whenever the prism 2 is disposed in the light path as shown in FIG. 1, light reflected from the surface 2b is converged by a condensing lens 4 so as to form an image I2. A photometric device 5 is disposed relative to the image I2 so as to obtain photometric data concerning the image I2. By way of example, the photometric device 5 is a photomultiplier, a charged-coupled device (CCD), or a silicon photodiode (SPD).

Photometric data from the photometric device 5 is transmitted to a controller 6. The controller 6 can be operable to calculate, e.g., exposure parameters based on the photometric data. A shutter driver 7 is connected to the controller 6. The shutter driver 7 is operable, upon receiving a command from the user to make a photographic exposure, to accordingly actuate a shutter 8 situated in the light path between the lens system 1 and the film surface 3.

The controller 6 can also be operable to actuate a prism driver (not shown) operable to displace the prism 2 out of the light path. Such movement of the prism 2 can be coordinated with control of the shutter 8 such that the shutter 8 is actuated only after the prism 2 has been displaced. Such displacement of the prism 2 provides a straight light path from the object O to the film 3. Upon actuation of the shutter 8, the image I1 is recorded on the film 3.

Light reflected from the semitransparent surface 2a of the prism 2 is converged by a condensing lens 9 to form a real image I3 of the object O on a focusing glass 10 according to the invention. The real image I3 is the same as the image I1 that would otherwise form on the film surface. Light from the real image I3 on the focusing glass 10 is substantially collimated by an eyepiece 11 to enable a user (eye 12) to view the image I3. The user "sees" both the focusing glass 10 and the real image I3 on the focusing glass. The combination of the condensing lens 9, the focusing glass 10, and the eyepiece 11 comprises a "finder optical system."

Figure 2:
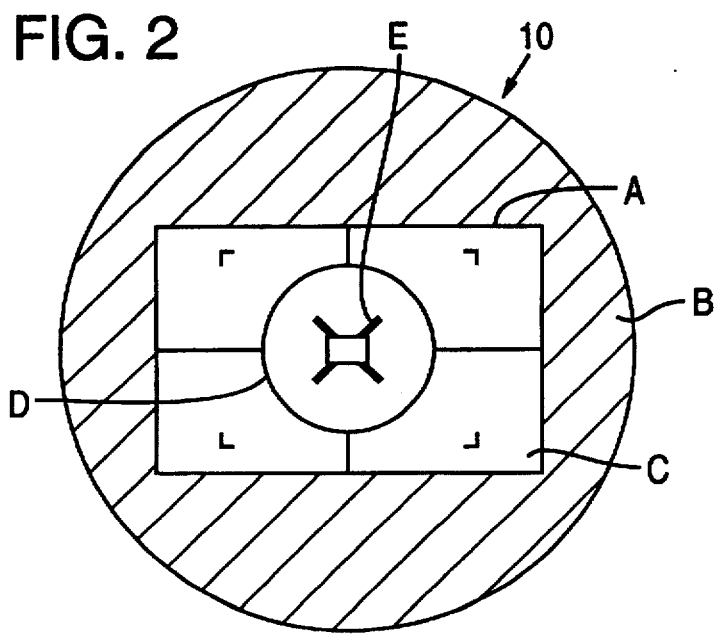
FIG. 2 is a top plan view of a first example embodiment of a focusing glass according to the invention.

An example embodiment of the focusing glass 10 is shown in FIG. 2. The focusing glass 10 comprises a circular substrate usually made of glass, fused quartz, or other suitable light-transmissive material. The focusing glass 10 includes a semitransparent region B having a light transmissivity of, e.g., 20%. The semitransparent region B is preferably a very thin metal film, such as chromium, formed by vapor deposition or other suitable technique on a major surface of the substrate. The semitransparent region B covers the entire focusing glass 10 except a "photographic zone" C defined by a "frame" A. The "photographic zone" C is the portion of the field of view of the focusing glass that would be or is being photographed. Preferably situated inside the photographic zone is a "photometric zone" D indicating the portion of the photographic zone analyzed by the photometric device 5. A reticle E (arranged, e.g., in a double-crosshair or other suitable configuration) is preferably situated within the photometric zone D for indicating the center of the photographic zone C. The reticle E is also useful for adjusting the diopter of any eyepiece used with the optical system.

The photometric zone D and reticle E can be delineated on the substrate by narrow lines of the same substance used to form the semitransparent film B. Alternatively, the lines delineating the photometric zone D, the reticle E, as well as the frame A can be of a non-transmissive substance such as a metal film.

Figure 3:
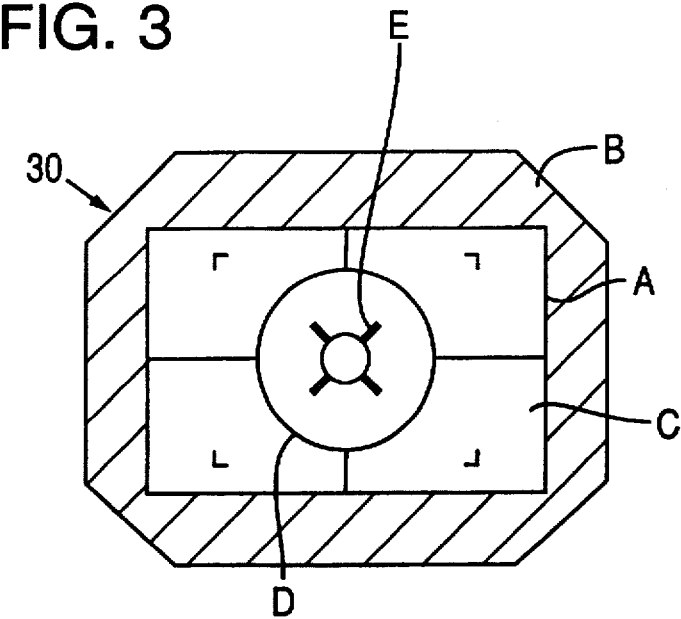
FIG. 3 is a top plan view of a second example embodiment of a focusing glass according to the invention.
Figure 4:
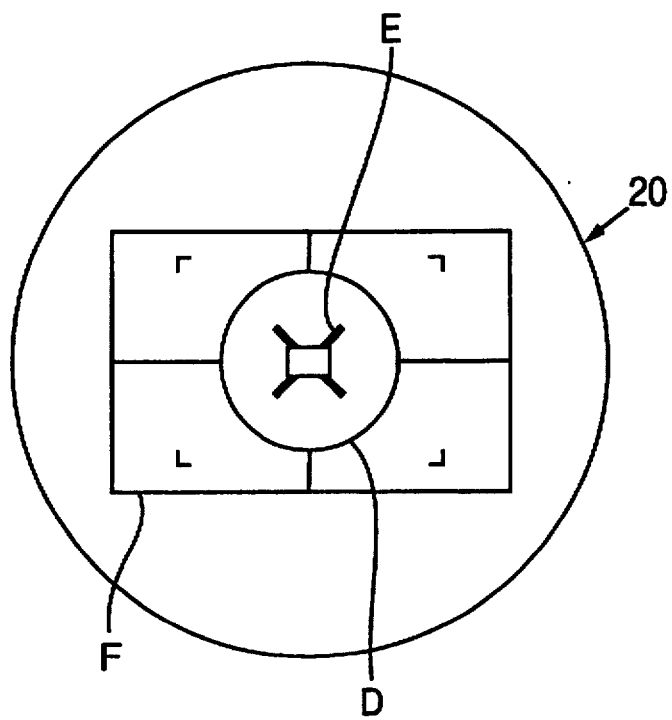
FIG. 4 is a top plan view of a prior-art focusing glass.

The shape of the focusing glass is not limited to the circular profile shown in FIG. 2. As a second example embodiment, the focusing glass can have a substantially rectangular profile as shown in FIG. 3. In the FIG.-3 embodiment of a focusing glass 30 according to the invention, the semitransparent region B is situated around the periphery of the focusing glass 30. The semitransparent region B has characteristics and is made as described above with respect to the FIG.-2 embodiment. The focusing glass 30 includes a frame A, similar to the frame shown in FIG. 2, defining a photographic zone C. Situated inside the photographic zone C is a photometric zone D as described above. The photometric zone D includes a reticle E as described above.

The semitransparent region B allows the metes and bounds of the photographic zone C to be readily distinguished while allowing visibility of the entire field of view including portions of the field of view appearing within the semitransparent region B. I.e., the portion of the field of view situated within the photographic zone C simply has a different contrast than the portion of the field of view situated within the semitransparent region B. Also, lines indicating the frame A, boundary of the photometric zone D, and reticle E are also clearly distinguishable in the field of view. These advantages markedly improve ease of use of a photographic system comprising such a focusing glass, compared with photographic systems comprising a prior-art focusing glass.

The photographic zone can include any of various additional lines, grids, and/or other alignment aids to facilitate use of the focusing screen as a photographic "finder."

Because the semitransparent region B as well as lines indicating the frame A, boundary of the photometric zone D, and reticle E can all be applied to the substrate using a single process such as vapor deposition, a focusing glass according to the present invention does not have a higher cost than prior-art focusing glasses.

The semitransparent film used to form the semitransparent region B preferably has a transmissivity within the range of 10 to 60 percent. Within this range, the portion of the field of view within the semitransparent region B is readily distinguishable from the portion of the field of view within the photographic zone C, and the field of view within the photographic zone C has satisfactory contrast. If the transmissivity is less than 10 percent, portions of the field of view within the semitransparent region B are too difficult to discern. If the transmissivity is greater than 60 percent, the portion of the field of view within the photographic zone C is insufficiently distinguishable from the portion of the field of view within the semitransparent region B, and lines such as those defining the boundary of the photometric zone D and the reticle E are too difficult to distinguish.

As described above and according to the present invention, because the photographic zone of the field of view is bounded by the semitransparent region, the photographic zone is readily distinguishable on the basis of contrast from the semitransparent region. The ability to observe the entire field of view along with the photographic zone greatly simplifies setting up the photographic system for obtaining photographic images.

A focusing glass according to this invention is particularly suitable for use as a "finder" in any of various photographic apparatus such as, but not limited to, photomicrography apparatus, apparatus comprising conventional still cameras (using photographic film), digital cameras (using digital recording medium), and apparatus comprising video or cinematography cameras.

Whereas the invention has been described in connection with preferred embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. A photographic system, comprising:
   (a) an objective operable to form a real image of an object located in a field of view of the objective; and
   (b) a finder optical system operable to guide light from the objective to a user's eye, the finder optical system comprising a focusing glass situated at a location where the real image is formed, the focusing glass comprising a semitransparent region surrounding a photographic zone having greater transmissivity to light than the semitransparent region, the focusing glass comprising a frame surrounded by the semitransparent region, the semitransparent region and the frame being made of a film material attached to the focusing glass, the film material having a lower transmittance than the photographic zone.

2. The photographic system of claim 1, wherein the semitransparent region and the photographic zone collectively enable the user to observe the field of view, the photographic zone being smaller than the field of view.

3. The photographic system of claim 1, wherein the frame delineates the photographic zone.

4. The photographic system of claim 1, wherein the semitransparent region has a transmissivity to the light of 10 to 60 percent.

5. The photographic system of claim 1, wherein the photographic zone comprises a photometric zone delineated within the photographic zone.

6. The photographic system of claim 4, further including a reticle within the photographic zone.

7. The photographic system of claim 6, wherein the reticle comprises a crosshair pattern.

8. A focusing glass, comprising a semitransparent region surrounding a photographic zone, the focusing glass being adapted for being placed at a location on an optical axis of an optical system at which a real image is formed of an object by an objective, the focusing glass comprising (i) a semitransparent region surrounding a fully transmissive photographic zone and (ii) a frame surrounded by the semitransparent region, the semitransparent region and the frame being made of a film material attached to the focusing glass, the film material having a lower transmittance than the photographic zone.

9. The focusing glass of claim 8, wherein the frame delineates the photographic zone.

10. The focusing glass of claim 8, wherein the semitransparent region has a transmissivity within a range of 10 to 60 percent.

* * * * *